(12) United States Patent
Horii et al.

(10) Patent No.: US 9,836,397 B2
(45) Date of Patent: Dec. 5, 2017

(54) DIRECT MEMORY ACCESS OF DYNAMICALLY ALLOCATED MEMORY

(71) Applicant: INTERNATIONAL BUSINESS MACHINES CORPORATION, Armonk, NY (US)

(72) Inventors: Hiroshi Horii, Tokyo (JP); Hiroshi Inoue, Tokyo (JP); Kazunori Ogata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 189 days.

(21) Appl. No.: 14/946,831

(22) Filed: Nov. 20, 2015

(65) Prior Publication Data
US 2017/0147507 A1  May 25, 2017

(51) Int. Cl.
*G06F 13/28* (2006.01)
*G06F 12/10* (2016.01)
(Continued)

(52) U.S. Cl.
CPC ........ *G06F 12/0811* (2013.01); *G06F 12/023* (2013.01); *G06F 13/28* (2013.01);
(Continued)

(58) Field of Classification Search
CPC .... G06F 12/1081; G06F 12/023; G06F 13/28; G06F 15/17331; G06F 2212/1044; G06F 2212/656
See application file for complete search history.

(56) References Cited

U.S. PATENT DOCUMENTS

| 8,839,267 B2 | 9/2014 | Lopez Taboada et al. |
| 9,015,426 B2 | 4/2015 | Stabrawa et al. |

(Continued)

FOREIGN PATENT DOCUMENTS

CN  101303656 A  11/2008

OTHER PUBLICATIONS

Huang, Jian et. al., High-Performance of HBase with RDMA over InfiniBand, 2012 IEEE 26th International Parallel and Distributed Processing Symposium, May 21, 2012, pp. 774-785, IEEE, Shanghai, China <http://ieeexplore.ieee.org/xpl/articleDetails.jsp?arnumber=6267886/>.

(Continued)

*Primary Examiner* — Glenn A Auve
(74) *Attorney, Agent, or Firm* — Vazken Alexanian

(57) ABSTRACT

Method and apparatus for direct memory access of dynamically allocated memory. The apparatus includes: a state receiving module operable to receive a reallocation state of a dynamically allocated memory; an address receiving module operable to receive a dynamic address of a data segment stored in the dynamically allocated memory; a data access module operable to access the dynamic address via a direct memory access (DMA) protocol; and a determining module operable to determine whether a reallocation state received before access to the dynamic address is identical to a reallocation state received after access to the dynamic address. Also provided, a method for verification of data accessed from a dynamically allocated memory and a method and apparatus for allowing a server to provide access to data from a dynamically allocated memory by a client device.

28 Claims, 8 Drawing Sheets

(51) Int. Cl.
*G06F 12/0811* (2016.01)
*G06F 15/173* (2006.01)
*G06F 12/02* (2006.01)

(52) U.S. Cl.
CPC ............... *G06F 15/17331* (2013.01); *G06F 2212/1044* (2013.01); *G06F 2212/656* (2013.01)

(56) References Cited

U.S. PATENT DOCUMENTS

| | | | | |
|---|---|---|---|---|
| 2010/0250831 | A1* | 9/2010 | O'Brien | G06F 11/3433 711/103 |
| 2011/0107057 | A1* | 5/2011 | Petolino, Jr. | G06F 12/1027 711/207 |
| 2013/0031293 | A1* | 1/2013 | Van Riel | G06F 12/10 711/6 |
| 2014/0325012 | A1 | 10/2014 | Guerin et al. | |
| 2015/0067086 | A1 | 3/2015 | Adriaens et al. | |
| 2015/0100752 | A1* | 4/2015 | Flood | G06F 12/0269 711/171 |
| 2015/0356007 | A1* | 12/2015 | Bacon | G06F 12/0253 711/159 |

OTHER PUBLICATIONS

Lu, Xiaioyi et. al., High-Performance Design of Hadoop RPC with RDMA over InfiniBand, 2013 42nd International Conference on Parallel Processing (ICPP), Oct. 1, 2013, pp. 641-650, IEEE, Lyon, France <http://ieeexplore.ieee.org/xpls/abs_all.jsp?arnumber=6687402/>.

Islam, N.S. et. al., High Performance RDMA-based Design of HDFS over InfiniBand, 2012 International Conference for High Performance Computing, Networking, Storage and Analysis (SC), Nov. 10, 2012, pp. 1-12, IEEE, Salt Lake City, Utah, USA <http://ieeexplore.ieee.org/xpls/abs_all.jsp?arnumber=6468497/>.

\* cited by examiner

DIRECT MEMORY ACCESS OF DYNAMICALLY ALLOCATED MEMORY

TECHNICAL FIELD OF THE INVENTION

The present invention relates to direct memory access of a dynamically allocated computer-readable memory.

BACKGROUND OF THE INVENTION

Direct memory access (DMA) can be used by a computer to access information stored on a memory without involving a processor responsible for managing the memory. Since there is no CPU consumption, DMA provides ultra-low latency and high throughput. In order to perform direct memory access, the computer must know the exact addresses of the information stored on the memory, instead of file names or other descriptive information that require a look-up by the processor. However, currently DMA can only be performed if the memory is statically allocated. If the memory is dynamically allocated, such as a JAVA™ heap memory portion, which is subject to routine reallocation, commonly referred to as "garbage collection," then the desired information can have changed addresses within the memory before being accessed by the computer. A heap memory portion can be read without DMA, such as using "java.net.Socket". However, this consumes CPU resources, and increases latency. If the heap memory portion is read with DMA, the information will be different after a garbage collection has been performed. Moreover, the computer can not be aware that the information accessed is different than the desired information.

SUMMARY OF THE INVENTION

Therefore, it is an object of the present invention to provide a client device capable of overcoming the above drawbacks accompanying the related art. The above and other objects can be achieved by combinations described in the claims.

According to a first aspect of the present invention, an apparatus for verification of data accessed from a dynamically allocated memory is provided. The apparatus includes: a state receiving module operable to receive a reallocation state of a dynamically allocated memory; an address receiving module operable to receive a dynamic address of a data segment stored in the dynamically allocated memory; a data access module operable to access the dynamic address via a direct memory access (DMA) protocol; and a determining module operable to determine whether a reallocation state received before access to the dynamic address is identical to a reallocation state received after access to the dynamic address.

According to a second aspect of the present invention, a computer-implemented method for verification of data accessed from a dynamically allocated memory is provided. The method includes: receiving a reallocation state of a dynamically allocated memory as an initial allocation state from a server; receiving a dynamic address of a data segment stored in the dynamically allocated memory from the server; accessing the dynamic address of the server via a direct memory access (DMA) protocol; receiving the reallocation state as a final reallocation state from the server; and determining whether the initial reallocation state is identical to the final reallocation state.

According to a third aspect of the present invention, an apparatus for allowing a server to provide access to data from a dynamically allocated memory by a client device is provided. The apparatus includes: a dynamically allocated memory storing a data segment at a dynamic address; a statically allocated memory storing the dynamic address at an anchor address and a reallocation state at a state address; a state sending module operable to send a reallocation state of the dynamically allocated memory; an address sending module operable to send the dynamic address of a data segment stored in the dynamically allocated memory; and a data access provision module operable to provide a client device access to the dynamic address via a direct memory access (DMA) protocol.

According to a fourth aspect of the present invention, a computer-implemented method for allowing a server to provide access to data from a dynamically allocated memory by a client device is provided. The computer-implemented method includes: storing a data segment in a dynamically allocated memory at a dynamic address; storing the dynamic address in a statically allocated memory at an anchor address and a reallocation state in the statically allocated memory at a state address; sending a reallocation state of the dynamically allocated memory; sending the dynamic address of the data segment stored in the dynamically allocated memory; and providing a client device access to the dynamic address via a direct memory access (DMA) protocol

DETAILED DESCRIPTION OF PREFERRED EMBODIMENTS

Some preferable embodiments will be described in more detail with reference to the accompanying drawings, in which the preferable embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Figure 1:
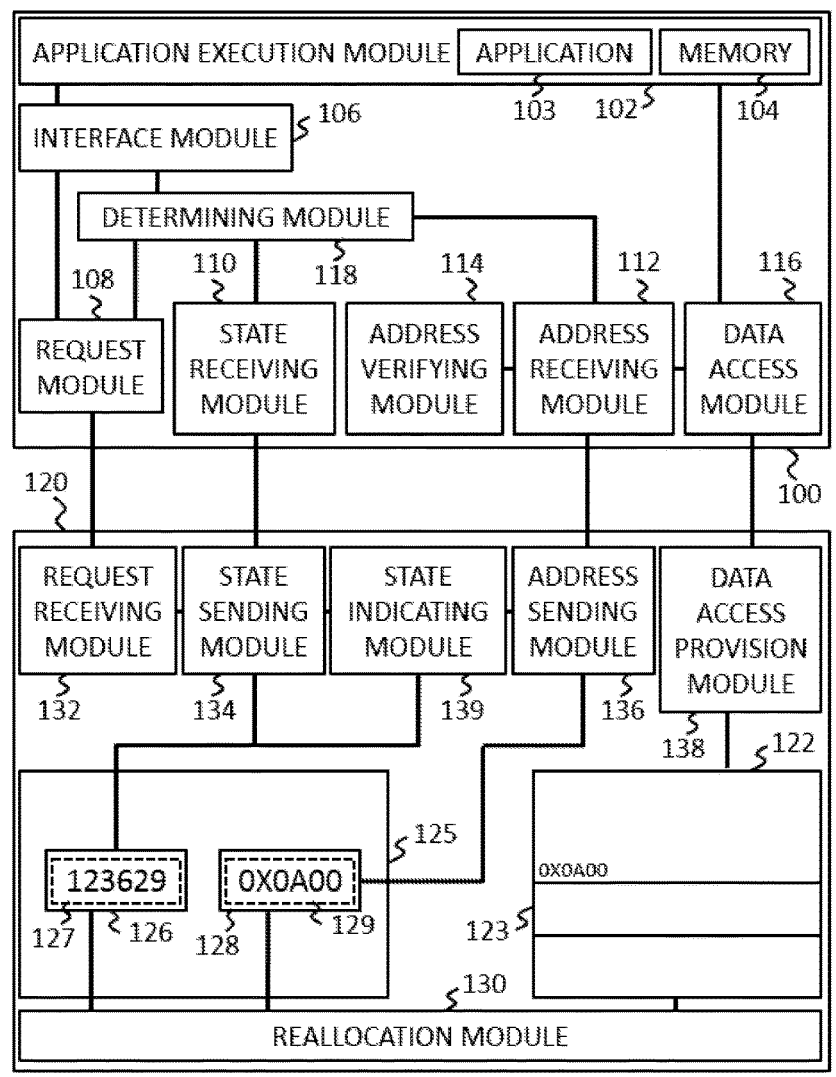
FIG. 1 shows a client device and a server, according to an embodiment of the present invention.

FIG. 1 shows client device 100 and server 120, according to an embodiment of the present invention. Client device 100 can access a dynamic address of a dynamically allocated memory, and can verify the data accessed at the dynamic address. Client device 100 can enable "RemoteHeap", a new method in which client device 100 reads data by tracing the structure of dynamically allocated memory 122 on server 120 through JAVA™ systems. Server 120 can provide data stored on a dynamically allocated memory and information assisting in the verification of the data accessed within the dynamically allocated memory through DMA or remote DMA (RDMA).

Client device 100 can include application execution module 102 including application 103 and memory 104, interface module 106, requesting module 108, state receiving module 110, an address receiving module 112, an address verification module 114, data access module 116, and determining module 118.

Application execution module 102 can be an application layer with hardware support for executing application 103, and includes memory 104 for storing data segment 123. Application 103 can be a user-interactive application, a background application, etc. Memory 104 can be a computer readable storage medium such as an electric storage device, a magnetic storage device, an optical storage device, an electromagnetic storage device, a semiconductor storage device, etc. Memory 104 can be allocated to application 103 in response to a memory allocation request from application 103 to interface module 106 executed on client 100. Memory 104 can be used for storing data segment 123 transferred through RDMA from server 120. In response to execution of application 103, application execution module 102 can send an RDMA initialization request and an RDMA read request to interface module 106.

Interface module 106 can be an operating system or other environment providing an application interface (API), which can include a graphical user interface (GUI). Interface module 106 can be connected to requesting module 108 and determining module 118. In response to receiving the RDMA initialization request and/or the RDMA read request from application execution module 102, interface module 106 can forward the request to requesting module 108.

Requesting module 108 is in communication with determining module 118, and interface module 106, and is operable to handle the RDMA initialization request and the RDMA read request from interface module 106. In response to receiving the RDMA initialization request, requesting module 108 sends the request to request receiving module 132 of server 120 to request initializing an RDMA session. In response to receiving the RDMA read request after the initialization, requesting module 108 sends requests for reallocation state 127, dynamic address 129, and the like to server 120 for processing an RDMA read. Requesting module 108 can also receive RDMA read requests from determining module 118 when an RDMA read request must be retried.

State receiving module 110 is operable to receive reallocation state 127 of dynamically allocated memory 122. Reallocation state 127 is received from state address 126 of statically allocated memory 125 in response to the request for reallocation state 127 by requesting module 108 during an RDMA read. State receiving module 110 can receive reallocation state 127 through state sending module 134 of server 120. State receiving module 110 can be further operable to receive the reallocation state via a direct memory access (DMA) protocol. State receiving module 110 can forward reallocation state 127 to determining module 118.

Address receiving module 112 can be further operable to receive anchor address 128 and state address 126 during an RDMA initialization. Address receiving module 112 is also operable to receive a dynamic address 129 of a data segment 123 stored in dynamically allocated memory 122 in response to a request for the dynamic address 129 during an RDMA read. Dynamic address 129 is received from an anchor address 128 of statically allocated memory 125 in response to a request for anchor address 129 by requesting module 108 during an RDMA read. Address receiving module 112 can receive dynamic address 129 through address sending module 136 of server 120. Address receiving module 112 can be further operable to receive the dynamic address via a DMA protocol. Address receiving module 112 can forward dynamic address 129 to address verification module 114 and/or data access module 116.

Address verification module 114 is operable to verify that dynamic address 129 is within dynamically allocated memory 122 during an RDMA read. Address verification module 114 can receive dynamic address 129 from address receiving module 112. Address verification module 114 can further receive a range of addresses within dynamically allocated memory 122 from address receiving module 112. If verified, then address verification module 114 can send confirmation to address receiving module 112. If dynamic address 129 could not be verified, then address verification module 114 can notify address receiving module 112.

Data access module 116 is operable to access dynamic address 129 via a DMA protocol during an RDMA read. Data access module 116 can receive dynamic address 129 from address receiving module 112. Data access module 116 can access dynamic address 129 of dynamically allocated memory 122 to retrieve data segment 123. In response to accessing data segment 123, data access module 116 can store data segment 123 on memory 104. Data access module 116 can access dynamically allocated memory 122 through data access provision module 138 of server 120. Using the DMA protocol, data access module 116 accesses dynamically allocated memory 122 by supplying dynamic address 129, which is a physical address of data segment 123, rather than a description of data segment 123, such as a file name, code, and the like. Data access module 116 can be further operable to access a plurality of dynamic addresses via the DMA protocol, such as when more than one address is received from address receiving module 112. Data access module 116 can be further operable to access dynamic address 129 via a remote direct memory access (RDMA) protocol. Data segment 123 can include at least one other dynamic address, referred to as a sub-address. If data segment 123 contains a dynamic sub-address within dynamically allocated memory 122, then data access module 116 accesses the sub-address. Multiple dynamic sub-addresses stemming from data segment 123 can be accessed before the entire string of data can be obtained.

Determining module 118 is operable to determine whether a reallocation state received before access to dynamic address 129 is identical to a reallocation state received after access to dynamic address 129 during an RDMA read. Determining module 118 can receive reallocation state 127 read from state address 126 by state receiving module 110 at various times, and can compare reallocation states to determine whether or not two reallocation states are identical. Although FIG. 1 shows a specific value for the reallocation state, "123629," this value is subject to change.

Generally, identical reallocation states indicate that data segment 123 was correctly accessed. However, different reallocation states can indicate that data segment 123 was, or could be, moved to another address within dynamically allocated memory 122. Determining module 118 can be further operable to discard data accessed from dynamic address 129 in response to a determination that the reallocation state received before access to dynamic address 129 is not identical to the reallocation state received after access to dynamic address 129. Determining module 118 can reply to application execution module 102 through interface module 106 in response to an RDMA read request by indicating that the RDMA read request failed and must be retried from application 103.

Each of application execution module 102, interface module 106, requesting module 108, state receiving module 110, address receiving module 112, address verification module 114, data access module 116, and determining module 118 can be a circuit, a shared or dedicated computer readable medium storing computer readable program instructions executable by a shared or dedicated processor, etc.

Server 120 can include dynamically allocated memory 122 storing data segment 123 at dynamic address 129, statically allocated memory 125 storing reallocation state 127 at state address 126 and dynamic address 129 at anchor address 128, reallocation module 130, request receiving module 132, state sending module 134, address sending module 136, data access provision module 138, and state indicating module 139.

Dynamically allocated memory 122 stores data segment 123 at dynamic address 129. Statically allocated memory 125 stores dynamic address 129 at the anchor address 128 and reallocation state 127 at state address 126. Statically allocated memory 125 and dynamically allocated memory 122 can be one or more computer readable storage mediums such as an electric storage device, a magnetic storage device, an optical storage device, an electromagnetic storage device, a semiconductor storage device, etc. Statically allocated memory 125 and dynamically allocated memory 122 can be portions of the same computer readable storage medium. For instance, a computer readable storage medium can have a designated portion subject to periodic reallocation, while the remainder is not.

In JAVA™ systems, a designed portion subject to periodic reallocation is referred to as a heap memory portion. Reallocation state 127 and dynamic address 129 are stored on statically allocated memory 125 so that their addresses, state address 126 and anchor address 128, respectively, are not changed during reallocation. This allows reallocation state 127 and dynamic address 129 to be read via the DMA and/or RDMA protocols. In JAVA™ systems, static fields of classes are never moved if classes are not collected. A server application can record dynamic address 129 of data segment 123 to anchor address 128. Reallocation state 127 can also include a flag that represents whether dynamically allocated memory 122 is currently subject to reallocation, reallocation of dynamically allocated memory 122 has been temporarily disabled, etc., such as in the IBM™ J9 JVMTI library. Dynamically allocated memory 122 can grow, but does not shrink. In JAVA™ systems, setting the same maximum and minimum sizes of the heap memory portion is a common configuration for high performance. Dynamically allocated memory 122 and at least state address 126 and anchor address 128 of statically allocated memory 125 are coherent for data access provision module 138 and the central processing unit.

Reallocation module 130 is operable to modify reallocation state 127 and dynamic address 129 in response to reallocation of dynamically allocated memory 122. Dynamically allocated memory 122 can be reallocated. Reallocation of dynamically allocated memory 122 can cause the address of data segment 123 to change in dynamically allocated memory 122. In response to reallocation of dynamically allocated memory 122, reallocation module 130 determines the new address of data segment 123, records the new address at anchor address 128 of statically allocated memory 125, and updates reallocation state 127 at state address 126 of statically allocated memory 125. Reallocation module 130 can be further operable to modify reallocation state 127 based on the number of times that dynamically allocated memory 122 has been reallocated.

Request receiving module 132 is operable to receive requests for reallocation state 127, dynamic address 129, etc. during a processing of an RDMA read. Request receiving module 132 can be further operable to receive requests for initializing an RDMA session. Request receiving module 132 is in communication with state sending module 134, and address sending module 136. Request receiving module 132 can receive requests from requesting module 108 for reallocation state 127, dynamic address 129, etc.

State sending module 134 is operable to send reallocation state 127 of dynamically allocated memory 122 in response to a request for reallocation state 127 from requesting module 108 of client device 100 during processing an RDMA read. Reallocation state 127 is accessed from state address 126 of statically allocated memory 125. State sending module 134 can send reallocation state 127 to state receiving module 110 of client device 100. State sending module 134 can be further operable to send reallocation state 127 via the DMA protocol.

Address sending module 136 is operable to send dynamic address 129 of data segment 123 stored in dynamically allocated memory 122 in response to a request for dynamic address 129 during processing an RDMA read. Dynamic address 129 is accessed from anchor address 128 of statically allocated memory 125. Address sending module 136 can send dynamic address 129 to address receiving module 112 of client device 100. Address sending module 136 can be further operable to send dynamic address 129 via the DMA protocol. Address sending module 136 can be further operable to send anchor address 128 and state address 126.

Data access provision module 138 is operable to provide client device 120 access to dynamic address 129 via a direct memory access (DMA) protocol in response to a request from data access module 116 of client device 100. Data access provision module 138 can establish permissions for access to dynamically allocated memory 122 by data access module 116 of client device 100. Data access provision module 138 can provide access to dynamic address 129 of dynamically allocated memory 122 to retrieve data segment 123. Using the DMA protocol, data access provision module 138 can allow access to dynamically allocated memory 122 through dynamic address 129, which is a physical address of data segment 123, rather than a description of data segment 123, such as a file name, code, etc. In this manner, data segment 123 can be read without consuming resources of a central processing unit. Data access provision module 138 can include some portion of a network interface adapter, such as an RDMA capable network controller (RNIC). As with many types of RNICs, data access provision module 138 can command a memory management unit (MMU) to send a snoop to the last level caches (LLCs) of a processor, if necessary, to ensure that the processor is not currently changing the data being accessed.

State indicating module 139 is operable to indicate whether dynamically allocated memory 122 was reallocated between sending reallocation state 127 to client device 100 before providing client device 100 access to dynamic address 129 and sending reallocation state 127 to client device 100 after providing client device 100 access to dynamic address 129. In response to state sending module 134 sending a reallocation state 127, state indicating module 139 can record reallocation state 127 and the receiving device. Then, in response to data access provision module 138 providing access to the same receiving device, state indicating module 139 updates the record. Finally, in response to state sending module 134 sending reallocation state 127 to the same receiving device again, state indicating module 139 determines whether reallocation state 127 is identical to the previously sent reallocation state 127. If identical, then state indicating module 139 can have state sending module 134 indicate that reallocation state 127 is identical to the previously sent reallocation state 127 along with reallocation state 127. If not identical, then state indicating module 139 can have state sending module 134 indicate that reallocation state 127 is not identical to the previously sent reallocation state 127 along with reallocation state 127.

Each of reallocation module 130, request receiving module 132, state sending module 134, address sending module 136, data access provision module 138, and state indicating module 139 can be a circuit, a shared or dedicated computer readable medium storing computer readable program instructions executable by a shared or dedicated processor, etc.

In other embodiments of a client device, modules can be arranged differently, or can be combined or separated in different ways. In some embodiments, the requesting module, the state receiving module, the address verifying module, the address receiving module, and the data access module are part of a network interface. In some embodiments, communication among modules travels through a universal bus.

In other embodiments of a server, modules can be arranged differently, or can be combined or separated in different ways. In some embodiments, the request receiving module, the state sending module, the state indicating module, the address sending module, and the data access provision module are part of a network interface. In some embodiments, communication among modules travels through a universal bus.

Figure 2:
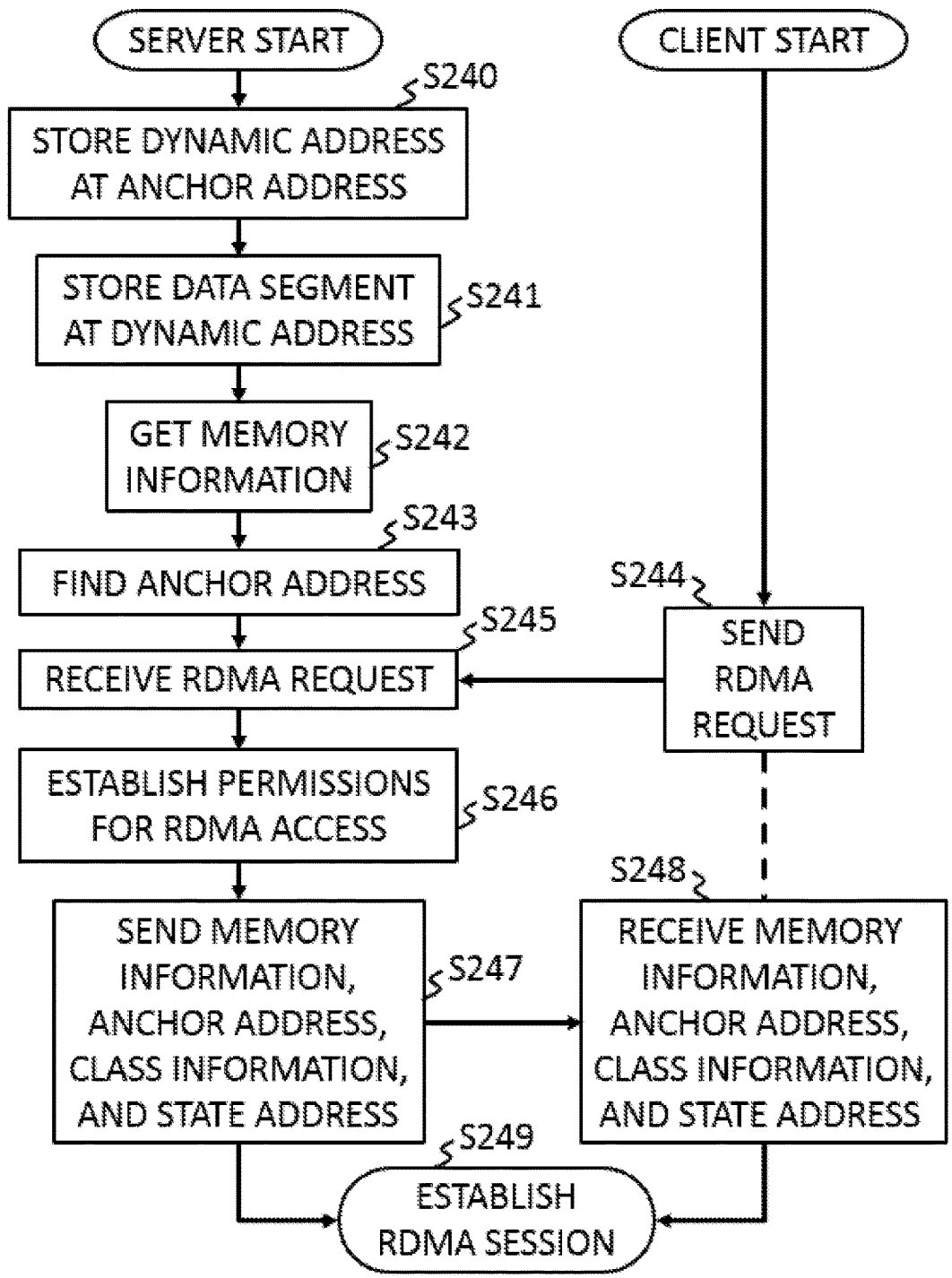
FIG. 2 shows a flow chart for exposing a dynamic address and establishing an RDMA session, according to an embodiment of the present invention.

FIG. 2 shows a flow chart for exposing a dynamic address and establishing an RDMA session, according to an embodiment of the present invention. FIG. 2 shows one example of the operational flow between server 120 and client device 100 shown in FIG. 1. Server 120 and client device 100 are not limited to using the operational flow of FIG. 1. The operational flow in FIG. 2 can be performed by other embodiments of a server and a client device. FIG. 2 includes operations performed by both a server, such as server 120, which appears on the left side, and a client device, such as client device 100, which appears on the right side.

In S240, the server stores a dynamic address, such as dynamic address 129, in a statically allocated memory, such as statically allocated memory 125, at an anchor address, such as anchor address 128. Then, in S241, the server stores a data segment, such as data segment 123, in a dynamically allocated memory, such as dynamically allocated memory 122, at the dynamic address. The server can include an application execution module for executing a server-side application, and allocate the data segment and the anchor address in response to a memory allocation request from the server-side application to an operating system environment executed on the server. The application execution module of server can allocate the data segment and the anchor address in response to receiving an RDMA initialization request from the client device.

In S242, the server prepares information concerning dynamically allocated memory and/or statically allocated memory, such as a table of addresses within the dynamically allocated memory and/or statically allocated memory, to aid in the RDMA session. The server prepares the anchor address in S243, which is the starting address of a memory area storing the address of the data segment, for delivery to the client device.

In response to a requesting module, such as requesting module 108, sending a request to initialize an RDMA session in S244, a request receiving module in S245, such as request receiving module 132, receives the request to initialize the RDMA session. Once the request to initialize the RDMA session is received, a data access provision module, such as data access provision module 138, establishes permissions for RDMA access to the dynamically allocated memory and/or the statically allocated memory in S246. In S247, establishing permissions can include allowing "read" access to all or certain addresses in the dynamically allocated memory including the data segment, and/or statically allocated memory including the state address and the anchor address. The server then sends the prepared information, including the anchor address, the state address, and any class information that can assist in the RDMA session. In this manner, the server can register certain data for RDMA, and share which data is exposed. The client device receives the prepared information in S248, and the client device prepares for RDMA access. For example, a data access module, such as data access module 116, of the client device can receive status information and RDMA data to be stored in a memory, such as memory 104, of the client device without CPU interaction and/or interruption before data transfer, thereby establishing the RDMA session in S249.

Although FIG. 2 shows the server performing S240-S243 before the client device sends the request to initialize the RDMA session, in other embodiments the client device can send a request to initialize the RDMA session at any time.

Figure 3A:
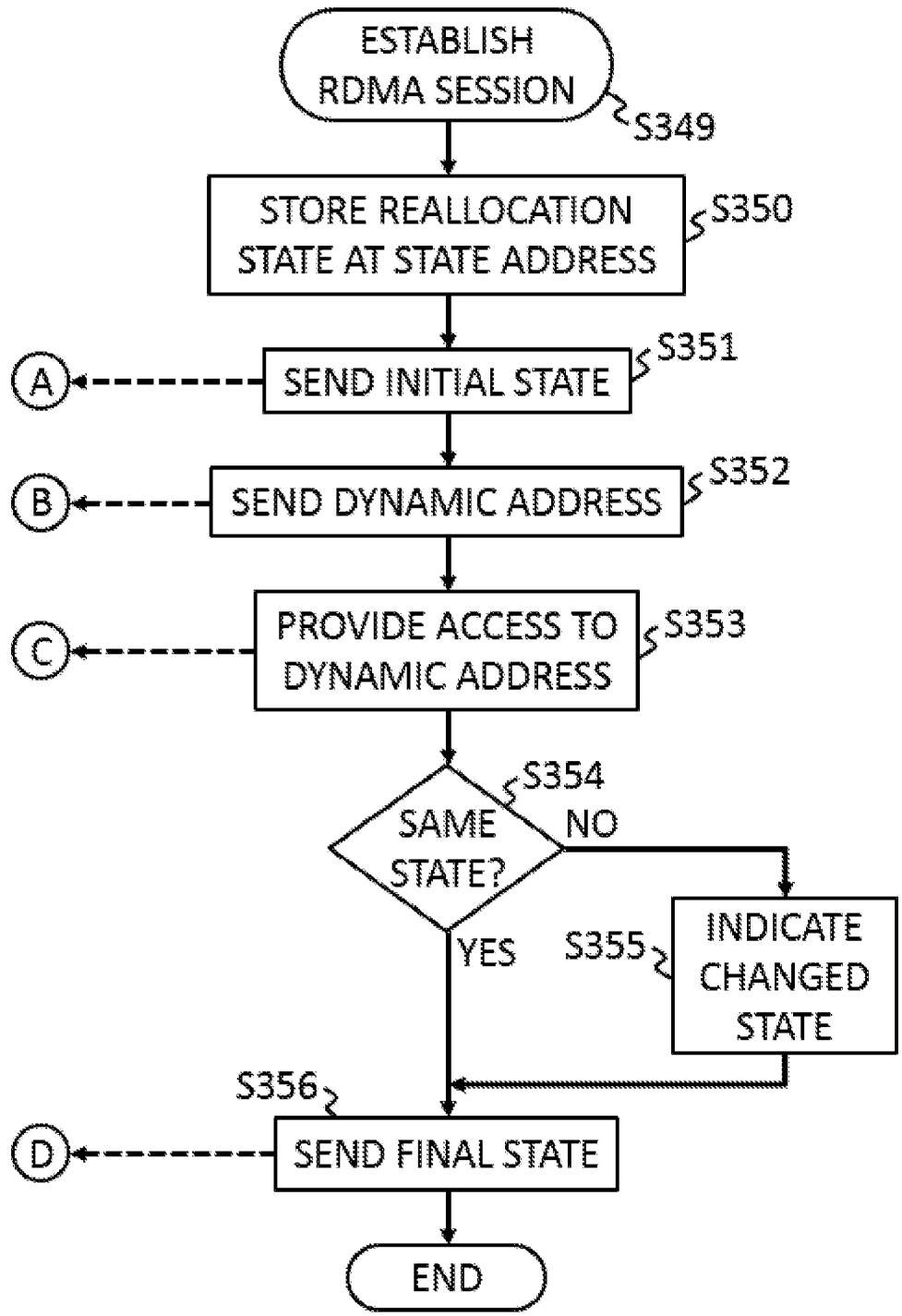
FIG. 3A shows a flow chart for providing access to a dynamic address of a dynamically allocated memory, according to an embodiment of the present invention.

FIG. 3A shows a flow chart for providing access to a dynamic address, such as dynamic address 129, of a dynamically allocated memory, such as dynamically allocated memory 122, according to an embodiment of the present invention. The encircled letters in FIG. 3A correspond to the encircled letters in FIG. 3B. FIG. 3A shows one example of the operational flow of server 120 shown in FIG. 1, but server 120 is not limited to using this operational flow, and the operational flow in FIG. 3A can be performed by other embodiments of a server. This process begins as the RDMA session is established in S349.

The server stores a reallocation state, such as reallocation state 127, in a statically allocated memory, such as statically allocated memory 125, at a state address, such as state address 126, of a data segment, such as data segment 123, which can be potentially relocated in S350. S350 can be performed asynchronously with other steps, and in response to reallocation of the dynamically allocated memory. However, S350 must be performed at least once before S351.

A state sending module, such as state sending module 134, of the server then sends the reallocation state of the dynamically allocated memory to the client device as an initial reallocation state in S351. Once the reallocation state has been sent, an address sending module, such as address sending module 136, of the server sends the dynamic address of a data segment stored in the dynamically allocated memory to the client device in S352.

Once the dynamic address has been sent, a data access provision module, such as data access provision module 138, of the server provides the client device access to the dynamic address via a direct memory access (DMA) protocol in S353. This can include providing the client device access to at least one dynamic sub-address included in the data segment via the DMA protocol. For providing the client device access to the dynamic address, the data access provision module can read the target area of the data segment directly without interacting with the CPU of the server, and sends the data segment to the client device.

Once the dynamic address has been accessed, the state sending module will send the reallocation state of the dynamically allocated memory to the client device as a final reallocation state. However, before actually sending the final reallocation state, the server can optionally determine whether the final reallocation state is identical to the initial reallocation state in S354. If the final reallocation state is not identical to the initial reallocation state, then a state indicating module, such as state indicating module 139, of the server will append an indication that the reallocation state has changed to the final reallocation state in S355. If the final reallocation state is identical to the initial reallocation state, then the server will not append an indication that the reallocation state has changed to the final reallocation state. Once the determination is made and any indications have been appended, the state sending module sends the reallocation state of the dynamically allocated memory to the client device as a final reallocation state in S356.

The process of FIG. 3A can allow a server to assist in verifying data accessed from a dynamically allocated memory by a client device through a DMA protocol by indicating changed states at S355.

In this embodiment, the address sending module is ensured to read the dynamic address after the state sending module reads the state address. However, even if the memory read order cannot be ensured, it is possible to roll-back the process to S351 in other embodiments, such as the embodiment of FIG. 4.

Figure 3B:
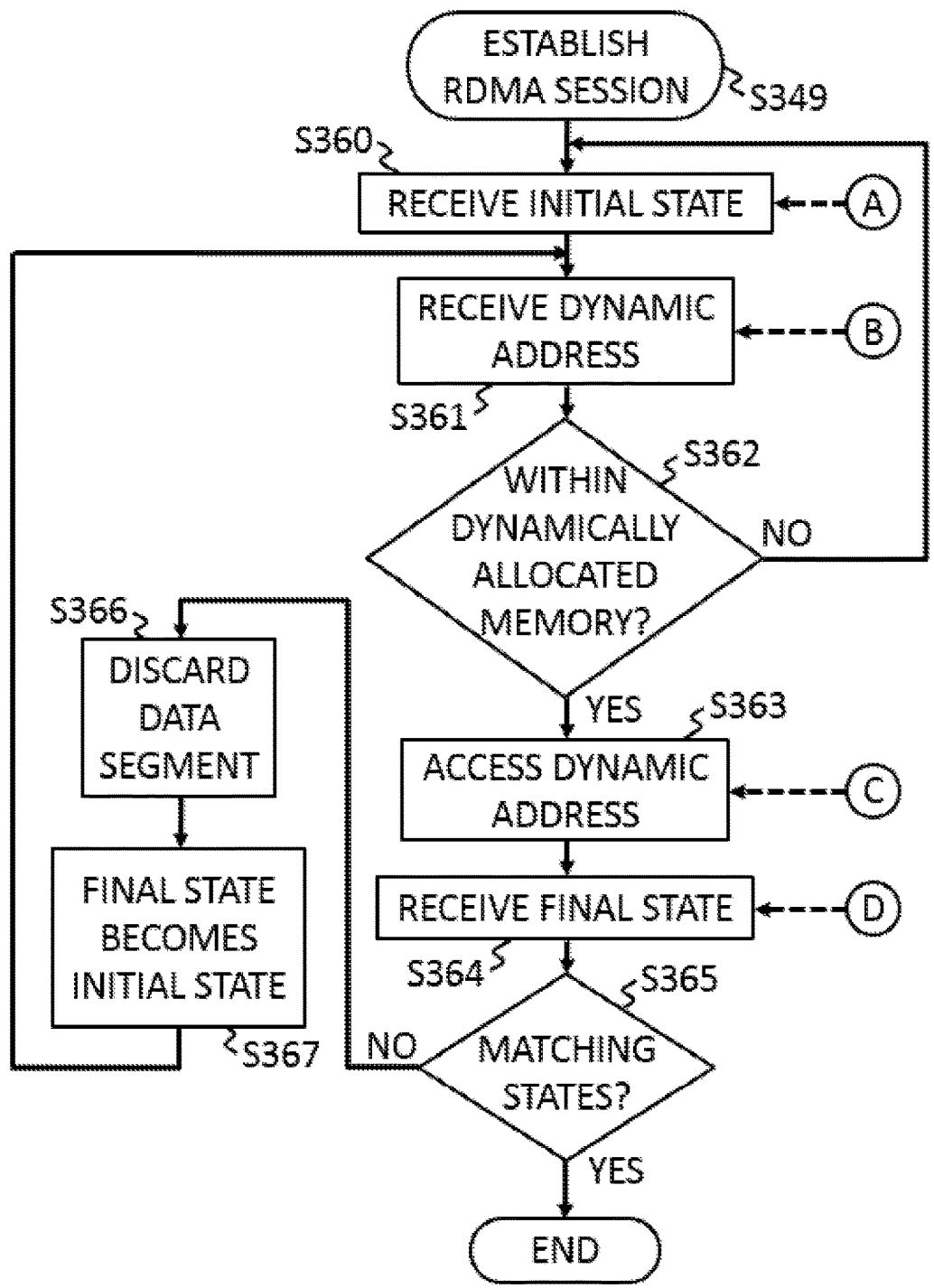
FIG. 3B shows a flow chart for accessing a dynamic address of a dynamically allocated memory, according to an embodiment of the present invention.

FIG. 3B shows a flow chart for accessing a dynamic address, such as dynamic address 129, of a dynamically allocated memory, such as dynamically allocated memory 122, according to an embodiment of the present invention. The encircled letters in FIG. 3B correspond to the encircled letters in FIG. 3A. FIG. 3B shows one example of the operational flow of client device 100 shown in FIG. 1, but client device 100 is not limited to using this operational flow, and the operational flow in FIG. 3B can be performed by other embodiments of a client device. This process begins as the RDMA session is established in S349. A state receiving module, such as state receiving module 110, of the client device receives a reallocation state, such as reallocation state 127, of the dynamically allocated memory as an initial allocation state from the server in S360. Once the initial allocation state has been received, an address receiving module, such as address receiving module 112, of the client device receives the dynamic address of a data segment, such as data segment 123, stored in the dynamically allocated memory from the server in S361. Once the dynamic address has been received, an address verifying module, such as address verifying module 112, of the client device verifies that the dynamic address is within the dynamically allocated memory, according to the table of addresses within the dynamically allocated memory received from the server in S362. If the dynamic address is not within the dynamically allocated memory, then client device will assume that an error has occurred, and will begin the process over at S360. If the dynamic address is within the dynamically allocated memory, then a data access module, such as data access module 116, of the client device accesses the dynamic address of the server via the RDMA protocol in S363. As the client device accesses the dynamic address, the data access provision module of the server can read the target area of the data segment directly without interacting with the CPU of the server, and sends the data segment to the client device.

Once the dynamic address has been accessed, and the data segment has been retrieved on the memory of the client device, the state receiving module receives the reallocation state as a final reallocation state from the server in S364. Once the final reallocation state has been received, a determining module, such as determining module 118, of the client device determines whether the initial reallocation state is identical to the final reallocation state. If the initial reallocation state is identical to the final reallocation state, or the final reallocation state indicates that no reallocation had occurred since the initial reallocation state was read, then the client device can assume that the data segment is correct, or that the data segment was correctly read from the correct address, and can end the session. However, if the initial reallocation state is not identical to the final reallocation state, or the final reallocation state indicates that at least one reallocation had occurred since the initial reallocation state was read, then the client device can discard the read data in the memory of the client device in S366, convert the final reallocation state to the initial reallocation state in S367, and return the process to S361, where the address receiving module receives an updated dynamic address in response to the determination that the reallocation state received before access to the dynamic address is not identical to the reallocation state received after access to the dynamic address. The data access module then accesses the updated dynamic address in response to the determination that the reallocation state received before access to the dynamic address is not identical to the reallocation state received after access to the dynamic address.

The process of FIG. 3B can free memory for alternate use by discarding data at S366, can enable acquisition of the correct data segment when a previously received data segment fails verification by returning to S361, and can allow errors to be detected earlier in the transaction, thereby saving time in acquiring the correct data segment, by checking the table of addresses within the dynamically allocated memory at S362.

Figure 4:
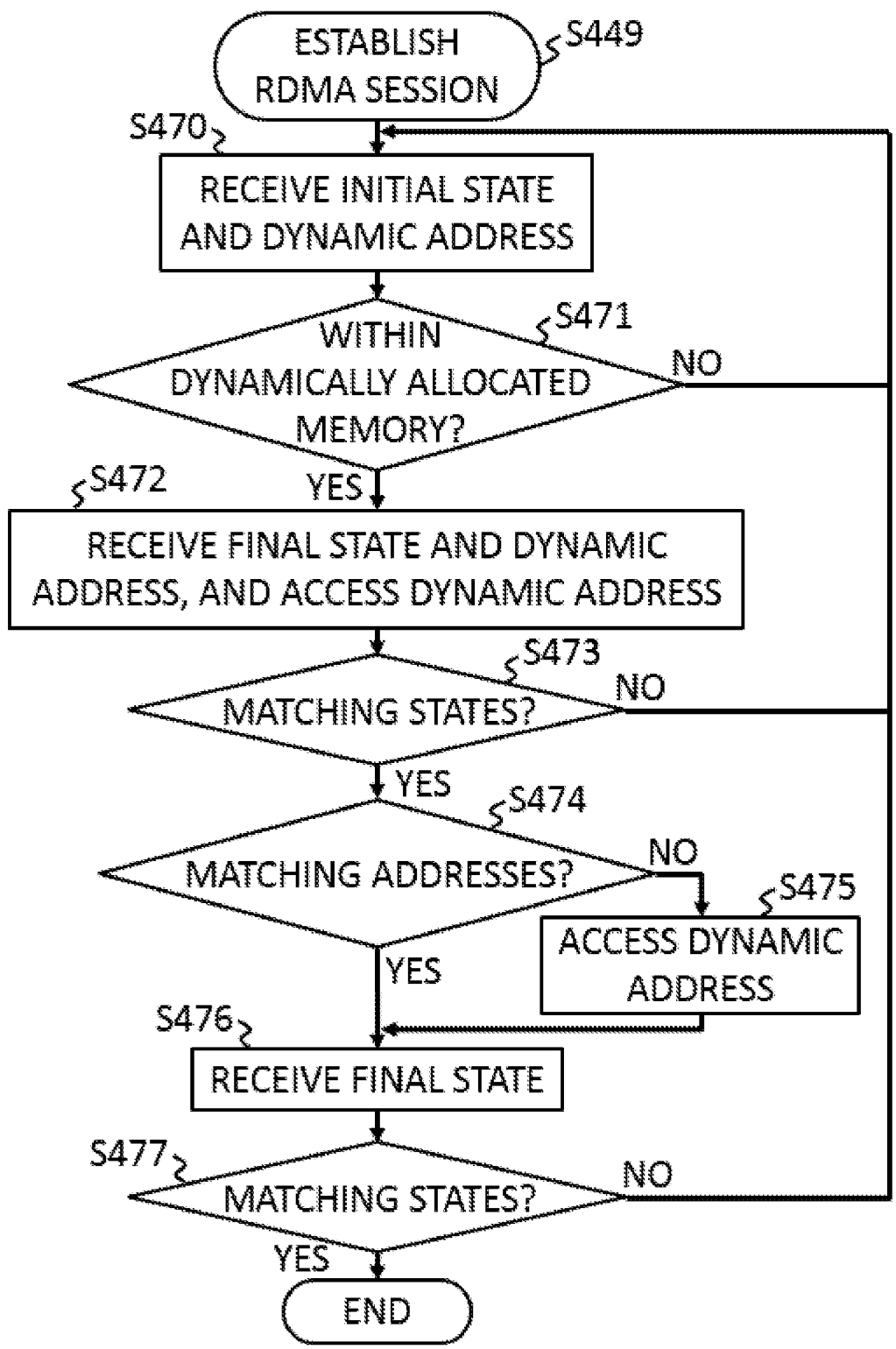
FIG. 4 shows a flow chart for accessing a dynamic address of a dynamically allocated memory through a reduced number of interactions, according to an embodiment of the present invention.

FIG. 4 shows a flow chart for accessing a dynamic address, such as dynamic address 129, of a dynamically allocated memory, such as dynamically allocated memory 122, through a reduced number of interactions, according to an embodiment of the present invention. FIG. 4 shows one example of the operational flow of client device 100 shown in FIG. 1, but client device 100 is not limited to using this operational flow, and the operational flow in FIG. 4 can be performed by other embodiments of a client device. This process begins as the RDMA session is established in S449. A requesting module, such as requesting module 108, of the client device sends a combined request for a reallocation state, such as reallocation state 127, and the dynamic address to the server. In response, a state receiving module, such as state receiving module 110, of the client device receives a reallocation state as an initial reallocation state, and an address receiving module, such as address receiving module 112, of the client device receives the dynamic address in S470. Once the dynamic address has been received, an address verifying module, such as address verifying module 112, of the client device verifies that the dynamic address is within the dynamically allocated memory, according to the prepared information received from the server in S471. If the dynamic address is not within the dynamically allocated memory, then client device will assume that an error has occurred, and will begin the process over at S470. If the dynamic address is within the dynamically allocated memory, then the requesting module will send another combined request, and the reallocation state and the dynamic address will be received as the previously received dynamic address is accessed in S472. The reallocation state is received as a final reallocation state at S472. Once the final reallocation state has been received, a determining module, such as determining module 118, of the client device determines whether the initial reallocation state is identical to the final reallocation state in S473. In other words, the determining module determines whether the reallocation state received in response to the combined request before access to the dynamic address is identical to the reallocation state received in response to the combined request during access to the dynamic address. If the initial reallocation state is not identical to the final reallocation state, then the client device returns to S470. If the initial reallocation state is identical to the final reallocation state, then an address determining module of the client device determines whether the dynamic address received in response to the combined request before access to the dynamic address is identical to the dynamic address received in response to the combined request during access to the dynamic address in S474. If the dynamic address received before access is not identical to the dynamic address receiving during access, then the dynamic address received during access is accessed in S475. Once the dynamic address received during the previous access has been accessed, or in the event that the dynamic address received before access is identical to the dynamic address receiving during access at S474, a final reallocation state is received in S476, and the determining module determines whether the initial reallocation state is identical to the final reallocation state in S477. If the initial reallocation state is not identical to the final reallocation state, then the client device returns to S470 after converting the final reallocation state to the initial reallocation state. If the initial reallocation state is identical to the final reallocation state at S477, then the client device assumes the data segment is correct, and can end the session.

The process of FIG. 4 can reduce the number of interactions by combining requests and accesses at S470 and S472, can more quickly acquire correct data in the event of an error while utilizing combined requests and accesses at S472.

Figure 5A:
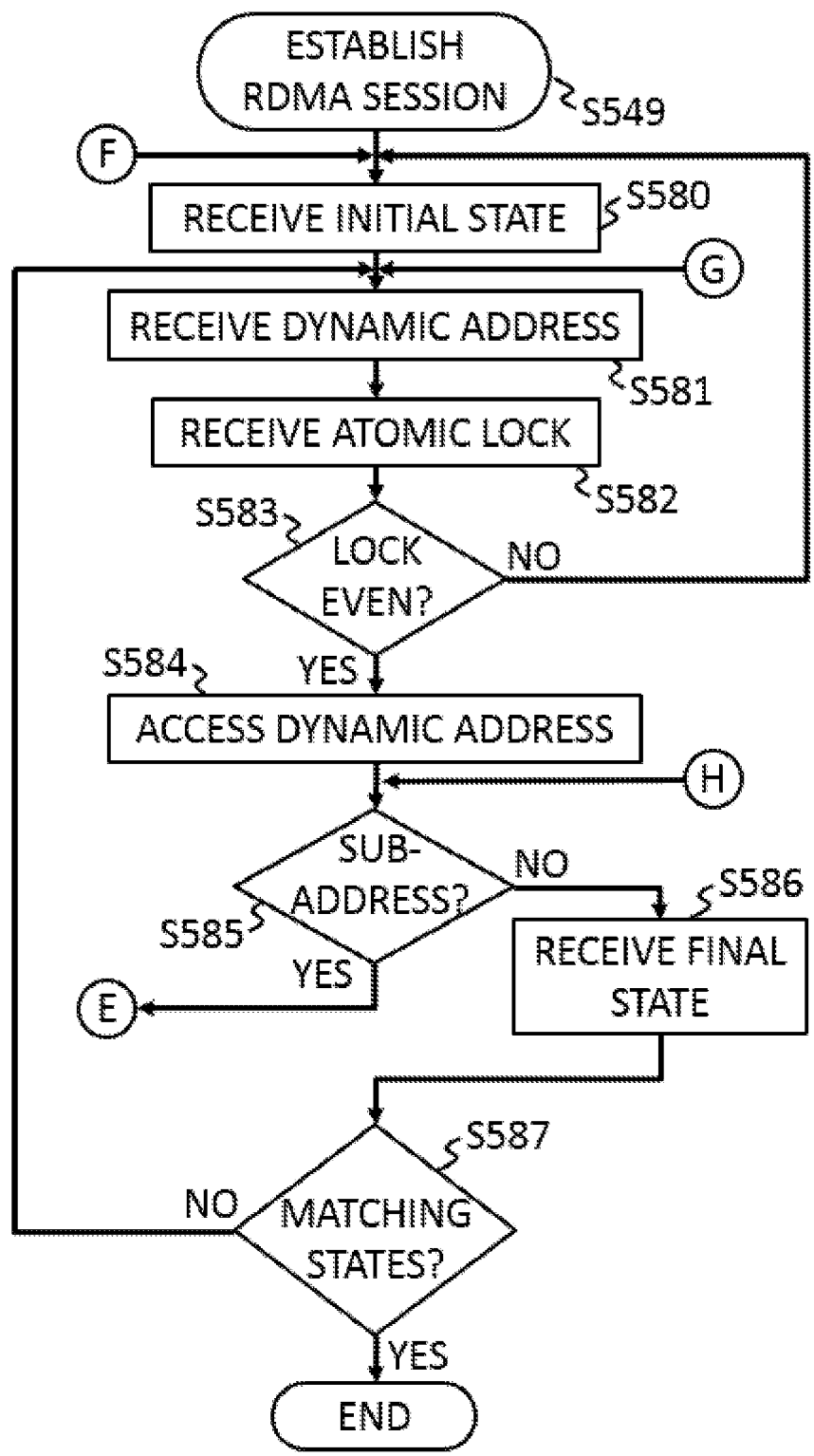
FIG. 5A show a flow chart for accessing a data segment stored at multiple dynamic addresses of a dynamically allocated memory, according to an embodiment of the present invention.
Figure 5B:
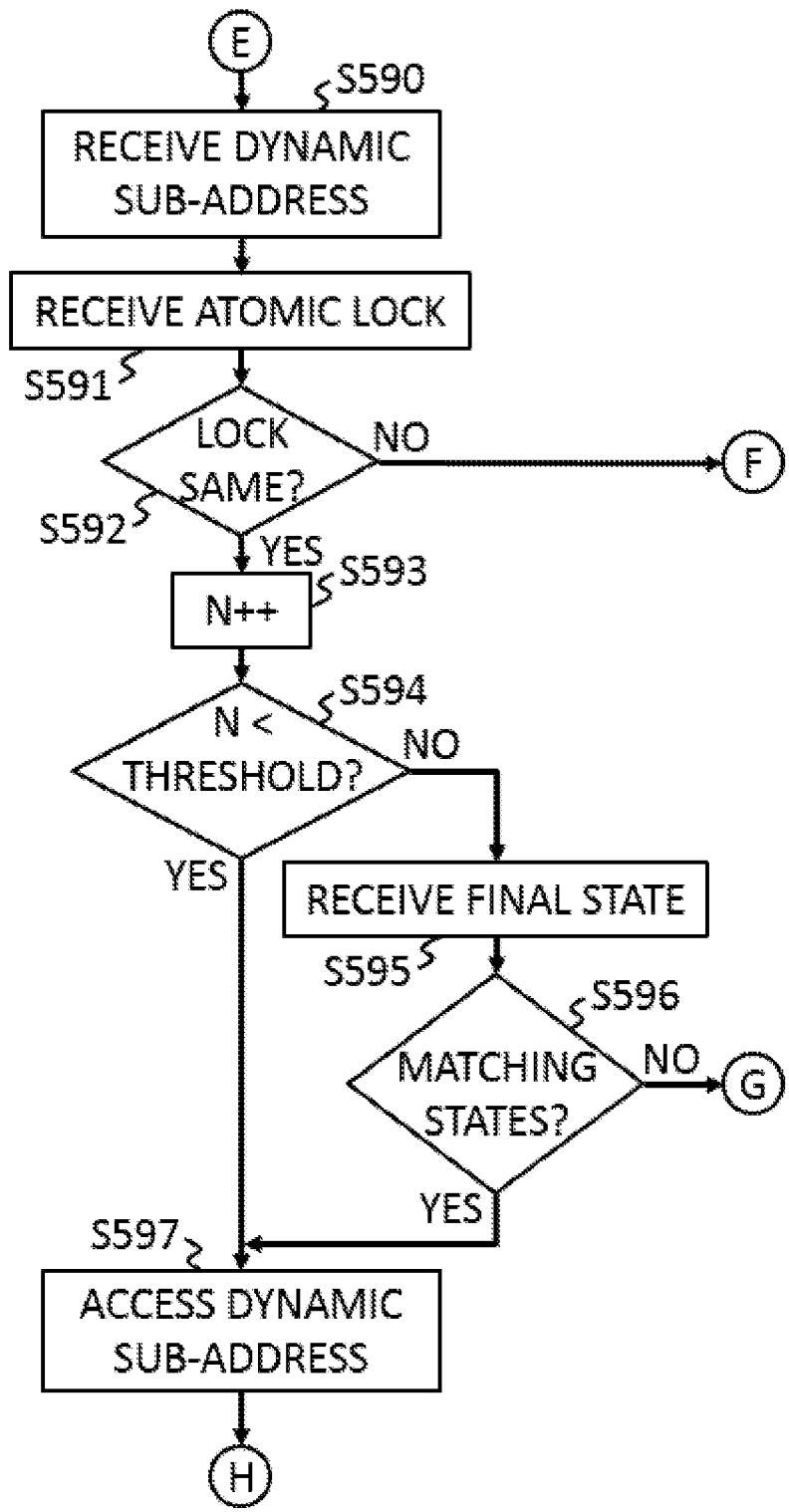
FIG. 5B show a flow chart for accessing a data segment stored at multiple dynamic addresses of a dynamically allocated memory, according to an embodiment of the present invention.

FIGS. 5A and 5B show a flow chart for accessing a data segment stored at multiple dynamic addresses of a dynamically allocated memory, according to an embodiment of the present invention. The encircled letters in FIG. 5A correspond to the encircled letters in FIG. 5B. FIGS. 5A and 5B show one example of the operational flow of client device 100 shown in FIG. 1, but client device 100 is not limited to using this operational flow, and the operational flow in FIGS. 5A and 5B can be performed by other embodiments of a client device. This process begins as the RDMA session is established in S549. A state receiving module, such as state receiving module 110, of the client device receives a reallocation state, such as reallocation state 127, of a dynamically allocated memory, such as dynamically allocated memory 122, as an initial reallocation state from the server in S580. Once the initial reallocation state has been received, an address receiving module, such as address receiving module 112, of the client device receives the dynamic address of a data segment stored in the dynamically allocated memory from the server in S581. Once the dynamic address has been received, an atomic lock is received in S582. The atomic lock is a variable value that is set and updated by the server during an atomic process. More specifically, the server increases the atomic lock by 1 in response to starting an atomic process. Then, the server increases the atomic lock by 1 again in response to completing the atomic process. Once the client device receives the atomic lock, the client device verifies whether the atomic lock is an even number in S583. If the atomic lock is not even, then the client device assumes that the server is currently performing an atomic process, and returns the process to S580. If the atomic lock is even, then a data access module, such as data access module 116, of the client device accesses the dynamic address of the server via the RDMA protocol in S584. The data segment can include at least one other dynamic address, referred to as a sub-address. Upon accessing the dynamic address of the data segment, the data access module can read at least one dynamic sub-address from the data segment. A sub-address is an address within the data segment that points to a further data segment within the dynamically allocated memory, such as a pointer, a link, a reference, etc. A sub-address can be in the same format as the dynamic address. Sub-addresses can be used, for example, in nodes of a linked list. Sub-addresses can also be used, for example, to point to a popular data segment that forms a part of multiple data strings. Rather than repeat the popular data segment for each of the multiple data strings, each of the multiple data strings includes a sub-address that points to a single instance of the popular data segment, thereby decreasing memory usage. If the data segment does not include any addresses within the data segment, then a final reallocation state is received in S586, and a determining module, such as determining module 118, determines whether the initial reallocation state is identical to the final reallocation state in S587. If the initial reallocation state is not identical to the final reallocation state, then the client device returns to S581 after converting the final reallocation state to the initial reallocation state. If the initial reallocation state is identical to the final reallocation state, then the client device assumes the data segment is correct, and can end the session. If the data segment does include an address within the data segment, then the client device will consider this a dynamic sub-address, and divert the process to FIG. 5B, starting with receiving the dynamic sub-address in S590. Once the dynamic sub-address is received, the client device receives the atomic lock in S591. Once the atomic lock is received, the client device determines whether the server performed an atomic process in S592. If the atomic lock received before access to the data segment is not equal to the atomic clock received after the dynamic sub-address is received, then the client device assumes that the server performed an atomic process, and returns the process to S580. If the atomic lock received before access to the data segment is equal to the atomic clock received after the dynamic sub-address is received, then the number of dynamic sub-addresses is increased in S593, and the client device determines whether the number of dynamic sub-addresses within the data segment has exceeded a threshold amount in S594. If the number of dynamic sub-addresses within the data segment have exceeded the threshold amount, then a final reallocation state is received in S595, and the determining module determines whether the initial reallocation state is identical to the final reallocation state in S596. In other words, at S596, the determining module determines whether a reallocation state received before access to the dynamic address is identical to a reallocation state received in response to accessing a threshold number of sub-addresses stemming from the data segment. If the initial reallocation state is not identical to the final reallocation state, then the client device returns to S581 after converting the final reallocation state to the initial reallocation state. If the initial reallocation state is identical to the final reallocation state, or if the number of dynamic sub-addresses within the data segment have not exceeded the threshold amount, then the data access module accesses the dynamic sub-address from the server via the DMA protocol in S597. Upon accessing the dynamic sub-address, the process returns to S585, where it is determined whether there are remaining sub-addresses stemming from the data segment.

The process of FIGS. 5A and 5B can enable direct access of data distributed across multiple data segments by reading dynamic sub-addresses at S590, and can verify data before all of the data segments have been collected to prevent infinite loops or other errors caused by reallocation of the dynamically allocated memory during direct memory access by verifying the reallocation states at S596 upon reaching a threshold at S594.

In other embodiments of multiple address access, the data access module will stop access of the at least one dynamic sub-address in response to accessing a threshold number of sub-addresses stemming from the data segment. This can prevent infinite loops or other errors caused by reallocation of the dynamically allocated memory during direct memory access.

Figure 6:
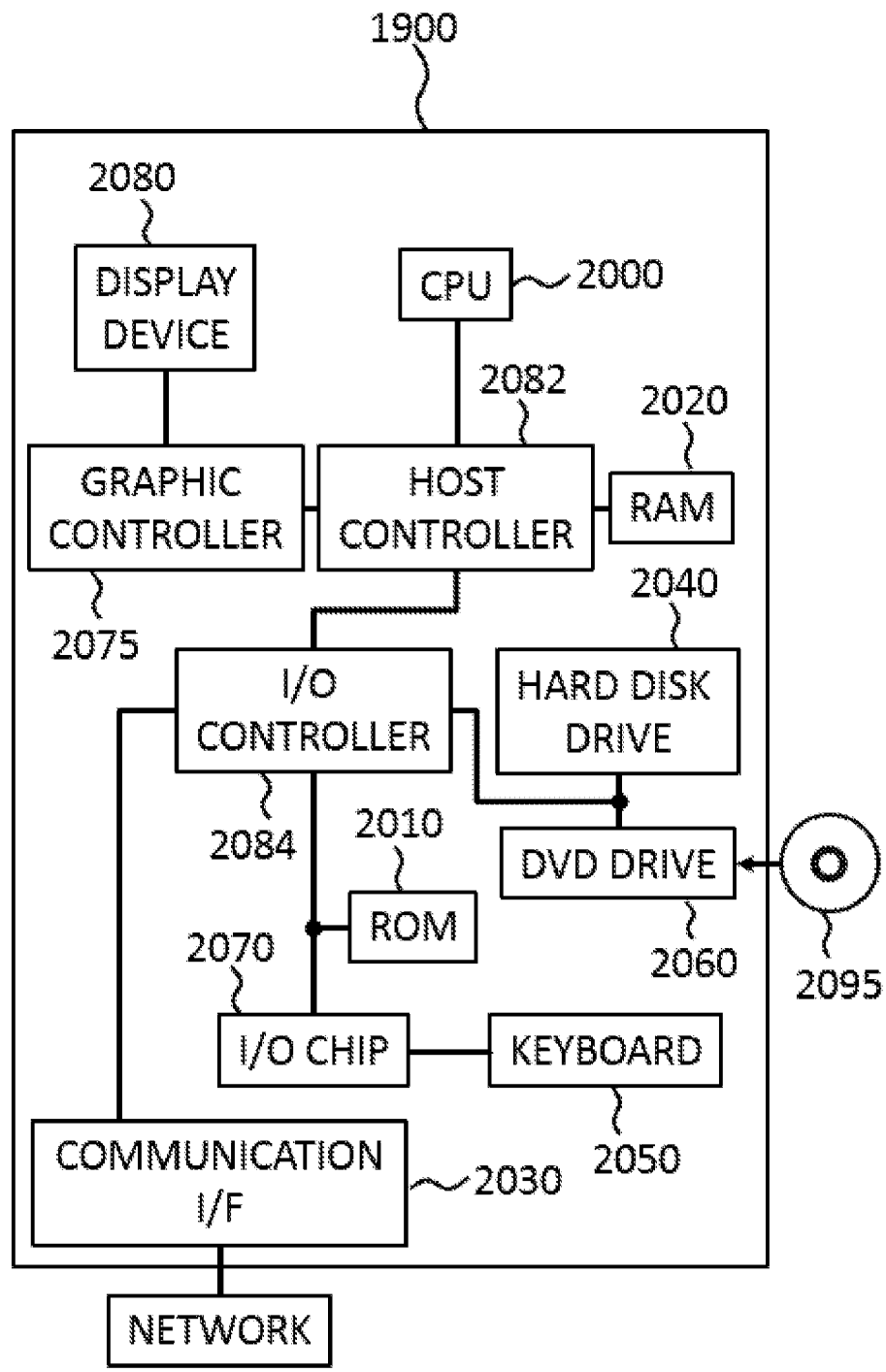
FIG. 6 shows a computer, according to an embodiment of the present invention.

FIG. 6 shows computer 1900, according to an embodiment of the present invention. Computer 1900 according to the present embodiment includes CPU 2000, RAM 2020, graphics controller 2075, and display apparatus 2080, which are mutually connected by host controller 2082. Computer 1900 also includes input/output units such as communication interface 2030, hard disk drive 2040, and DVD-ROM drive 2060, which are connected to host controller 2082 via input/output controller 2084. The computer also includes legacy input/output units such as ROM 2010 and keyboard 2050, which are connected to input/output controller 2084 through input/output chip 2070.

Host controller 2082 connects RAM 2020 with CPU 2000 and graphics controller 2075, which access RAM 2020 at a high transfer rate. CPU 2000 operates according to programs stored in ROM 2010 and RAM 2020, thereby controlling each unit. Graphics controller 2075 obtains image data generated by CPU 2000 on a frame buffer or the like provided in RAM 2020, and causes the image data to be displayed on display apparatus 2080. Alternatively, graphics controller 2075 can contain therein a frame buffer or the like for storing image data generated by CPU 2000.

Input/output controller 2084 connects host controller 2082 with communication interface 2030, hard disk drive 2040, and DVD-ROM drive 2060, which are relatively high-speed input/output units. Communication interface 2030 communicates with other electronic devices via a network. Hard disk drive 2040 stores programs and data used by CPU 2000 within computer 1900. DVD-ROM drive 2060 reads the programs or the data from DVD-ROM 2095, and provides hard disk drive 2040 with the programs or the data via RAM 2020.

ROM 2010 and keyboard 2050 and input/output chip 2070, which are relatively low-speed input/output units, are connected to input/output controller 2084. ROM 2010 stores therein a boot program or the like executed by computer 1900 at the time of activation, a program depending on the hardware of computer 1900. Keyboard 2050 inputs text data or commands from a user, and can provide hard disk drive 2040 with the text data or the commands via RAM 2020. Input/output chip 2070 connects keyboard 2050 to input/output controller 2084, and can connect various input/output units via a parallel port, a serial port, a keyboard port, a mouse port, and the like to input/output controller 2084.

A program to be stored on hard disk drive 2040 via RAM 2020 is provided by a recording medium as DVD-ROM 2095, and an IC card. The program is read from the recording medium, installed into hard disk drive 2040 within computer 1900 via RAM 2020, and executed in CPU 2000.

A program that is installed in computer 1900 can cause computer 1900 to function as a client device, such as client device 100 of FIG. 1. The program or module acts on CPU 2000, to cause computer 1900 to function as a section, component, element, such as each element of client device 100 of FIG. 1 (e.g., state receiving module 110, address receiving module 112, data access module 116, determining module 118, requesting module 108, address verification module 114, interface module 106, and application execution module 102, and the like).

A program that is installed in computer 1900 can cause computer 1900 to function as an apparatus such as server 120 of FIG. 1. The program or module acts on CPU 2000, to cause computer 1900 to function as a section, component, or element such as each element of server 120 of FIG. 1 (e.g., state sending module 134, address sending module 136, data access provision module 138, request receiving module 132, state indicating module 139, reallocation module 130, and the like).

The information processing described in these programs is read into computer 1900, to function as the determining section, which is the result of cooperation between the program or module and the above-mentioned various types of hardware resources. Moreover, the apparatus is constituted by realizing the operation or processing of information in accordance with the usage of computer 1900.

For example, in response to communication between computer 1900 and an external device, CPU 2000 can execute a communication program loaded onto RAM 2020, to instruct communication processing to communication interface 2030, based on the processing described in the communication program.

Communication interface 2030, under control of CPU 2000, reads the transmission data stored on the transmission buffering region provided in the recording medium, such as RAM 2020, hard disk drive 2040, or DVD-ROM 2095, and transmits the read transmission data to a network, or writes reception data received from a network to a reception buffering region or the like provided on the recording medium. In this way, communication interface 2030 can exchange transmission/reception data with the recording medium by a DMA (direct memory access) method, or by a configuration that CPU 2000 reads the data from the recording medium or communication interface 2030 of a transfer destination, to write the data into communication interface 2030 or the recording medium of the transfer destination, so as to transfer the transmission/reception data.

In addition, CPU 2000 can cause all or a necessary portion of the file of the database to be read into RAM 2020 such as by DMA transfer, the file or the database having been stored in an external recording medium such as hard disk drive 2040, DVD-ROM drive 2060 (DVD-ROM 2095) to perform various types of processing onto the data on RAM 2020. CPU 2000 can then write back the processed data to the external recording medium by means of a DMA transfer method or the like. In such processing, RAM 2020 can be considered to temporarily store the contents of the external recording medium, and so RAM 2020, the external recording apparatus, and the like are collectively referred to as a memory, a storage section, a recording medium, a computer readable medium, etc.

Various types of information, such as various types of programs, data, tables, and databases, can be stored in the recording apparatus, to undergo information processing. Note that CPU 2000 can also use a part of RAM 2020 to perform reading/writing thereto on the cache memory. In such an embodiment, the cache is considered to be contained in RAM 2020, the memory, and/or the recording medium unless noted otherwise, since the cache memory performs part of the function of RAM 2020.

CPU 2000 can perform various types of processing, onto the data read from RAM 2020, which includes various types of operations, processing of information, condition judging, search/replace of information, etc., as described in the present embodiment and designated by an instruction sequence of programs, and writes the result back to RAM 2020. For example, if performing condition judging, then CPU 2000 can judge whether each type of variable shown in the present embodiment is larger, smaller, no smaller than, no greater than, or equal to the other variable or constant, and if the condition judging results in the affirmative (or in the negative), then the process branches to a different instruction sequence, or calls a sub routine.

In addition, CPU 2000 can search for information in a file, a database, etc., in the recording medium. For example, if a plurality of entries, each having an attribute value of a first attribute is associated with an attribute value of a second attribute, are stored in a recording apparatus, then CPU 2000 can search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module can be stored in an external recording medium. Exemplary recording mediums include DVD-ROM 2095, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to computer 1900 via the network.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server.

In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s).

In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above, the embodiments of the present invention can be used to realize client device for direct memory access of dynamically allocated memory.

The first aspect can enable verification of data accessed from a dynamically allocated memory through a DMA protocol. The first aspect of the present invention can also include a computer-implemented method performed by the above apparatus, as well as a computer program product including a computer readable storage medium having program instructions embodied therewith, the program instructions executable by a processor to cause the processor to perform the computer-implemented method.

According to a second aspect of the present invention, the state receiving module can be further operable to receive the reallocation state via the DMA protocol, and the address receiving module can be further operable to receive the dynamic address via the DMA protocol. The second aspect can lower latency by using the DMA protocol for more interactions.

According to a third aspect of the present invention, the determining module can be further operable to discard data accessed from the dynamic address in response to a determination that the reallocation state received before access to the dynamic address is not identical to the reallocation state received after access to the dynamic address. The third aspect can free memory for alternate use.

According to a fourth aspect of the present invention, the address receiving module can be further operable to receive an updated dynamic address in response to a determination that the reallocation state received before access to the dynamic address is not identical to the reallocation state received after access to the dynamic address, and the data access module can be further operable to access the updated dynamic address in response to a determination that the reallocation state received before access to the dynamic address is not identical to the reallocation state received after access to the dynamic address. The fourth aspect can enable acquisition of the correct data segment when a previously received data segment fails verification.

According to a fifth aspect of the present invention, the data segment can include at least one dynamic sub-address, and the data access module can be further operable to access the at least one dynamic sub-address via the DMA protocol. The fifth aspect can enable direct access of data distributed across multiple data segments.

According to a sixth aspect of the present invention, the data access module can be further operable to stop accessing the at least one dynamic sub-address in response to accessing a threshold number of sub-addresses stemming from the data segment. The sixth aspect can prevent infinite loops or other errors caused by reallocation of the dynamically allocated memory during direct memory access.

According to a seventh aspect of the present invention, the determining module can be further operable to determine whether a reallocation state received before access to the dynamic address is identical to a reallocation state received in response to accessing a threshold number of sub-addresses stemming from the data segment. The seventh aspect can verify data before all of the data segments have been collected to prevent infinite loops or other errors caused by reallocation of the dynamically allocated memory during direct memory access.

According to an eighth aspect of the present invention, the data access module can be further operable to access the dynamic address via a remote direct memory access (RDMA) protocol. The eighth aspect can allow direct memory access of a dynamically allocated memory across a network, such as the Internet.

According to a ninth aspect of the present invention, the apparatus can further include an address verification module operable to verify that the dynamic address is within the dynamically allocated memory. The ninth aspect can allow errors to be detected earlier in the transaction, thereby saving time in acquiring the correct data segment.

According to a tenth aspect of the present invention, the apparatus can further include a requesting module operable to send a combined request for the reallocation state and the dynamic address to the server, and the determining module can be further operable to determine whether a reallocation state received in response to a combined request before access to the dynamic address is identical to a reallocation state received in response to a combined request during access to the dynamic address. The tenth aspect can reduce the number of interactions by combining requests and accesses.

According to an eleventh aspect of the present invention, the apparatus can further include a requesting module operable to send a combined request for the reallocation state and the dynamic address to the server, and an address determining module operable to determine whether a dynamic address received in response to a combined request before access to the dynamic address is identical to a dynamic address received in response to a combined request during access to the dynamic address. The eleventh aspect can more quickly acquire correct data in the event of an error while utilizing combined requests and accesses.

According to a thirteenth aspect of the present invention, the state sending module can be further operable to send the reallocation state via the DMA protocol, and the address sending module can be further operable to send the dynamic address via the DMA protocol. The thirteenth aspect can lower latency by using the DMA protocol for more interactions.

According to a fourteenth aspect of the present invention, the apparatus can further include a state indicating module operable to indicate whether the dynamically allocated memory was reallocated between sending the reallocation state to the client device before providing the client device access to the dynamic address and sending the reallocation state to the client device after providing the client device access to the dynamic address. The fourteenth aspect can allow a server to assist in verifying data accessed from a dynamically allocated memory by a client device through a DMA protocol.

What is claimed is:

1. An apparatus for verification of data accessed from a dynamically allocated memory, comprising:
   a state receiving module operable to receive a reallocation state of a dynamically allocated memory;
   an address receiving module operable to receive a dynamic address of a data segment stored in the dynamically allocated memory;
   a data access module operable to access the dynamic address via a direct memory access (DMA) protocol; and
   a determining module operable to determine whether a reallocation state received before access to the dynamic address is identical to a reallocation state received after access to the dynamic address.

2. The apparatus according to claim 1, wherein the state receiving module is further operable to receive the reallocation state via the DMA protocol.

3. The apparatus according to claim 1, wherein the address receiving module is further operable to receive the dynamic address via the DMA protocol.

4. The apparatus according to claim 1, wherein the determining module is further operable to discard data accessed from the dynamic address in response to a determination that the reallocation state received before access to the dynamic address is not identical to the reallocation state received after access to the dynamic address.

5. The apparatus according to claim 1, wherein the address receiving module is further operable to receive an updated dynamic address in response to a determination that the reallocation state received before access to the dynamic address is not identical to the reallocation state received after access to the dynamic address.

6. The apparatus according to claim 1, wherein the data access module is further operable to access the updated dynamic address in response to a determination that the reallocation state received before access to the dynamic address is not identical to the reallocation state received after access to the dynamic address.

7. The apparatus according to claim 1, wherein the data access module is further operable to access at least one dynamic sub-address from a data segment that includes at least one dynamic sub-address via the DMA protocol.

8. The apparatus according to claim 7, wherein the data access module is further operable to stop accessing the at least one dynamic sub-address in response to accessing a threshold number of sub-addresses stemming from the data segment.

9. The apparatus according to claim 7, wherein the determining module is further operable to determine whether a reallocation state received before access to the dynamic address is identical to a reallocation state received in response to accessing a threshold number of sub-addresses stemming from the data segment.

10. The apparatus according to claim 1, wherein the data access module is further operable to access the dynamic address via a remote direct memory access (RDMA) protocol.

11. The apparatus according to claim 1, wherein the address receiving module is further operable to receive an anchor address that store the dynamic address and a state address that stores the reallocation state.

12. The apparatus according to claim 1, further comprising an address verification module operable to verify that the dynamic address is within the dynamically allocated memory.

13. The apparatus according to claim 1, wherein the data access module is further operable to access a plurality of dynamic addresses via the DMA protocol.

14. The apparatus according to claim 1, further comprising a requesting module operable to send a combined request for the reallocation state and the dynamic address to the server.

15. The apparatus according to claim 14, wherein the determining module is further operable to determine whether a reallocation state received in response to a combined request before access to the dynamic address is identical to a reallocation state received in response to a combined request during access to the dynamic address.

16. The apparatus according to claim 1, further comprising:
   a requesting module operable to send a combined request for the reallocation state and the dynamic address to the server; and an address determining module operable to determine whether a dynamic address received in response to a combined request before access to the dynamic address is identical to a dynamic address received in response to a combined request during access to the dynamic address.

17. A computer-implemented method for verification of data accessed from a dynamically allocated memory, comprising:
receiving a reallocation state of a dynamically allocated memory as an initial allocation state from a server;
receiving a dynamic address of a data segment stored in the dynamically allocated memory from the server;
accessing the dynamic address of the server via a direct memory access (DMA) protocol;
receiving the reallocation state as a final reallocation state from the server; and
determining whether the initial reallocation state is identical to the final reallocation state.

18. The computer-implemented method according to claim 17, further comprising:
reading at least one dynamic sub-address from the data segment; and
accessing the at least one dynamic sub-address from the server via the DMA protocol.

19. The computer-implemented method according to claim 18, further comprising stopping access of the at least one dynamic sub-address in response to accessing a threshold number of sub-addresses stemming from the data segment.

20. The computer-implemented method according to claim 18, further comprising determining whether a reallocation state received before access to the dynamic address is identical to a reallocation state received in response to accessing a threshold number of sub-addresses stemming from the data segment.

21. A non-transitory computer program product for verification of data accessed from a dynamically allocated memory including a computer readable storage medium having program instructions embodied therewith, the program instructions executable by a processor device to cause the processor device to perform the computer-implemented method according to claim 17.

22. An apparatus for allowing a server to provide access to data from a dynamically allocated memory by a client device, the apparatus comprising:
a dynamically allocated memory storing a data segment at a dynamic address;
a statically allocated memory storing the dynamic address at an anchor address and a reallocation state at a state address;
a state sending module operable to send a reallocation state of the dynamically allocated memory;
an address sending module operable to send the dynamic address of a data segment stored in the dynamically allocated memory; and
a data access provision module operable to provide a client device access to the dynamic address via a direct memory access (DMA) protocol.

23. The apparatus according to claim 22, wherein the state sending module is further operable to send the reallocation state via the DMA protocol; and the address sending module is further operable to send the dynamic address via the DMA protocol.

24. The apparatus according to claim 22, further comprising a state indicating module operable to indicate whether the dynamically allocated memory was reallocated between sending the reallocation state to the client device before providing the client device access to the dynamic address and sending the reallocation state to the client device after providing the client device access to the dynamic address.

25. The apparatus according to claim 22, further comprising a reallocation module operable to modify the reallocation state and the dynamic address in response to reallocation of the dynamically allocated memory.

26. The apparatus according to claim 25, wherein the reallocation module is further operable to modify the reallocation state based on the number of times that the dynamically allocated memory has been reallocated.

27. A computer-implemented method for allowing a server to provide access to data from a dynamically allocated memory by a client device, the computer-implemented method comprising:
storing a data segment in a dynamically allocated memory at a dynamic address;
storing the dynamic address in a statically allocated memory at an anchor address and a reallocation state in the statically allocated memory at a state address;
sending a reallocation state of the dynamically allocated memory;
sending the dynamic address of the data segment stored in the dynamically allocated memory; and
providing a client device access to the dynamic address via a direct memory access (DMA) protocol.

28. The computer-implemented method according to claim 27, further comprising providing the client device access to at least one dynamic sub-address included in the data segment via the DMA protocol.

* * * * *